(12) United States Patent
Bhogal et al.

(10) Patent No.: US 8,391,680 B2
(45) Date of Patent: Mar. 5, 2013

(54) GENRE-BASED VIDEO QUOTA MANAGEMENT

(75) Inventors: Kulvir S. Bhogal, Pflugerville, TX (US); Gregory J. Boss, American Fork, UT (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 12/408,368

(22) Filed: Mar. 20, 2009

(65) Prior Publication Data

US 2010/0239227 A1    Sep. 23, 2010

(51) Int. Cl.
*H04N 5/76*    (2006.01)

(52) U.S. Cl. .................................. 386/291; 386/261

(58) Field of Classification Search .................. 386/83, 386/248, 261, 291
See application file for complete search history.

(56) References Cited

U.S. PATENT DOCUMENTS

| | | | |
|---|---|---|---|
| 5,808,662 A | 9/1998 | Kinney et al. | |
| 7,113,773 B2 | 9/2006 | Quick, Jr. et al. | |
| 7,114,172 B2 | 9/2006 | Lord | |
| 7,246,367 B2 | 7/2007 | Iivonen | |
| 7,669,219 B2 | 2/2010 | Scott, III | |
| 2003/0016673 A1 | 1/2003 | Pendakur et al. | |
| 2003/0056220 A1 | 3/2003 | Thornton et al. | |
| 2003/0086694 A1 | 5/2003 | Davidsson | |
| 2003/0099462 A1 | 5/2003 | Matsugami | |
| 2003/0156827 A1 | 8/2003 | Janevski | |
| 2003/0219228 A1 | 11/2003 | Thiagarajan et al. | |
| 2004/0006698 A1* | 1/2004 | Apfelbaum | 713/182 |
| 2004/0151474 A1 | 8/2004 | Suh | |
| 2005/0193023 A1 | 9/2005 | Ismail | |
| 2005/0246749 A1 | 11/2005 | Tsuruga et al. | |
| 2006/0052067 A1 | 3/2006 | Singh et al. | |
| 2006/0062147 A1 | 3/2006 | Dougall et al. | |
| 2006/0174293 A1 | 8/2006 | Ducheneaut | |
| 2006/0288361 A1 | 12/2006 | White Eagle et al. | |
| 2007/0174867 A1* | 7/2007 | Dunning et al. | 725/30 |
| 2007/0189708 A1 | 8/2007 | Lerman et al. | |
| 2007/0283403 A1 | 12/2007 | Eklund et al. | |
| 2008/0010518 A1 | 1/2008 | Jiang et al. | |
| 2008/0031589 A1* | 2/2008 | Ariyoshi et al. | 386/83 |
| 2008/0086743 A1 | 4/2008 | Cheng et al. | |
| 2008/0189380 A1 | 8/2008 | Bosworth | |
| 2008/0313402 A1 | 12/2008 | Wong et al. | |
| 2009/0044216 A1 | 2/2009 | McNicoll | |
| 2009/0074380 A1 | 3/2009 | Boston et al. | |
| 2009/0100478 A1* | 4/2009 | Craner et al. | 725/87 |
| 2009/0199013 A1 | 8/2009 | Raciborski | |
| 2009/0220216 A1 | 9/2009 | Marsh et al. | |
| 2009/0232472 A1* | 9/2009 | Pleiman | 386/83 |

(Continued)

*Primary Examiner* — Thai Tran
*Assistant Examiner* — Tracy Mangialaschi
(74) *Attorney, Agent, or Firm* — Mitch Harris, Atty at Law, LLC; Andrew M. Harris; Arthur J. Samodovitz

(57) ABSTRACT

A method, digital video display and digital video recording (DVR) device/system and computer program provide a mechanism for controlling an amount of differing types of media viewed by users. A number of time quotas are set for various media types and/or programs and viewing or recording of video media is monitored to determine whether any of the quotas has been exceeded. If a quota is exceeded, the viewing or recording can be immediately halted, or a warning or alert can be issued. If an absolute limit is exceeded after an alert is issue, further viewing or recording can be halted.

12 Claims, 5 Drawing Sheets

U.S. PATENT DOCUMENTS

2009/0263101 A1 10/2009 Rudolph et al.
2009/0304362 A1* 12/2009 Neufeld et al. ............... 386/124
2010/0107104 A1 4/2010 Bruce et al.
2010/0223660 A1* 9/2010 Scott et al. ........................ 726/4
2011/0030012 A1 2/2011 Diaz Perez

* cited by examiner

GENRE-BASED VIDEO QUOTA MANAGEMENT

BACKGROUND OF THE INVENTION

1. Field of the Invention

The present invention is related to consumer digital video display and digital video recording devices (DVRs), and more particularly to a method and system that manage viewing, recording and/or playback of video content according to quotas for different genres.

2. Description of Related Art

Digital video recorder (DVRs), which may be in the form of a portable device such as a personal video recorder (PVR), a set-top box or a computer having a video interface and/or video capability provided from a digital or analog network source are becoming ubiquitous in households and other locations. Further, present-day monitors and televisions provide a greater degree of programmable control than has been available in the past.

For the purposes of parental control/monitoring, parental controls have been implemented that block the viewing and/or recording of video material that carries an indication that the material may be unsuitable for children below a specified age. Such controls have been extended to digital media that carries rating information or title information that permits determining whether media may be unsuitable for viewing by some viewers and therefore requires a personal identification number (PIN) or other token to provide access.

However, even permissible media, when viewed in excess, may be undesirable. Depending on what the particular media is being viewed by a child or younger adult, parents, educational institutions and others may desire to promote certain content over other content or restrict the amount of less-desirable content that is displayed or recorded by such users.

Therefore, it would be desirable to provide a method and system that can provide control of video viewing or recording that is adaptable to the desirability of content of the media being viewed or recorded by a particular user or class of users, such as an age group of children.

BRIEF SUMMARY OF THE INVENTION

The invention is embodied in a method and system that provide for viewing and/or recording of video content. The system may be a digital video recording device (DVR) or television operated in conjunction with or operated by a computer program product that controls the DVR or television. The digital video recording device may be a personal video recorder (PVR), set-top box, personal computer, or any other device that provides recording of video content.

A user specifies time quotas for particular video media categories, e.g., educational, cartoon, entertainment, news, etc. Time lengths are specified for the time quotas and the viewing or recording of video media is controlled according to the time quotas. Video viewing and/or recording is monitored to determine whether any of the quotas has been exceeded and action is taken to prevent the quota being further exceeded. The action may be to immediately block viewing or recording of the video category, which may be to block scheduling of recording of a program for recording. Or, viewing/recording may continue and an alert is issued. An absolute limit may be imposed after the alert has occurred, blocking viewing or recording of media in a given category completely after the absolute limit has been reached. In one embodiment of the invention, the amount of storage space available to a user is reduced when less-preferred programming is selected for recording and increased when more-preferred programming is selected, providing motivation for a user to select preferred program types.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to digital video recorders (DVRs), digital televisions (DTVs) and other devices for viewing and/or recording digital video programs. The present invention implements time quotas, which are specified generally by an "administrative" user, such as a parent, that control the amount of viewing and/or recording time available to another user, such as a child, according to time quotas allocated for different corresponding video program types. The program type can be determined by channel, by program title, by keyword extraction from closed-caption information, by transmitted rating information or other information from which the program type can be evaluated. The relative desirability/undesirability or applicability/program type can also be determined from peer-to-peer systems that categorize the program. For example, a program generally rated "children's cartoon" may be noticed by a peer group as educational and peer-group ratings then used to re-categorize the program. That the user who specifies the time quotas is a different person or entity from the user that views/records the program information, is not a limitation of the invention, as the present invention may be used by a single user to specify and control their own viewing/recording habits. When a quota has been exceeded, recording or display of video programs in the particular category/program type may be immediately halted. Alternatively, an alert may be issued, either to the viewer or person selecting a program for recording, or to the "administrative" user, such as notifying a parent that a child has exceeded their quota (e.g., when over 1 hour of cartoons has been viewed or scheduled for recording in a given day). An absolute limit may be imposed past the quota in such alerting schemes, so that video viewing/recording is halted for time totals extending beyond an absolute limit for a video program type. Additionally, the category/type of a video program can be specified as an exact program match. For example, parents may wish to restrict the viewing of a particular program by their children to a predetermined non-zero time quota, allowing the children to view some amount of the particular program, but not in excess of a set limit.

Figure 1:
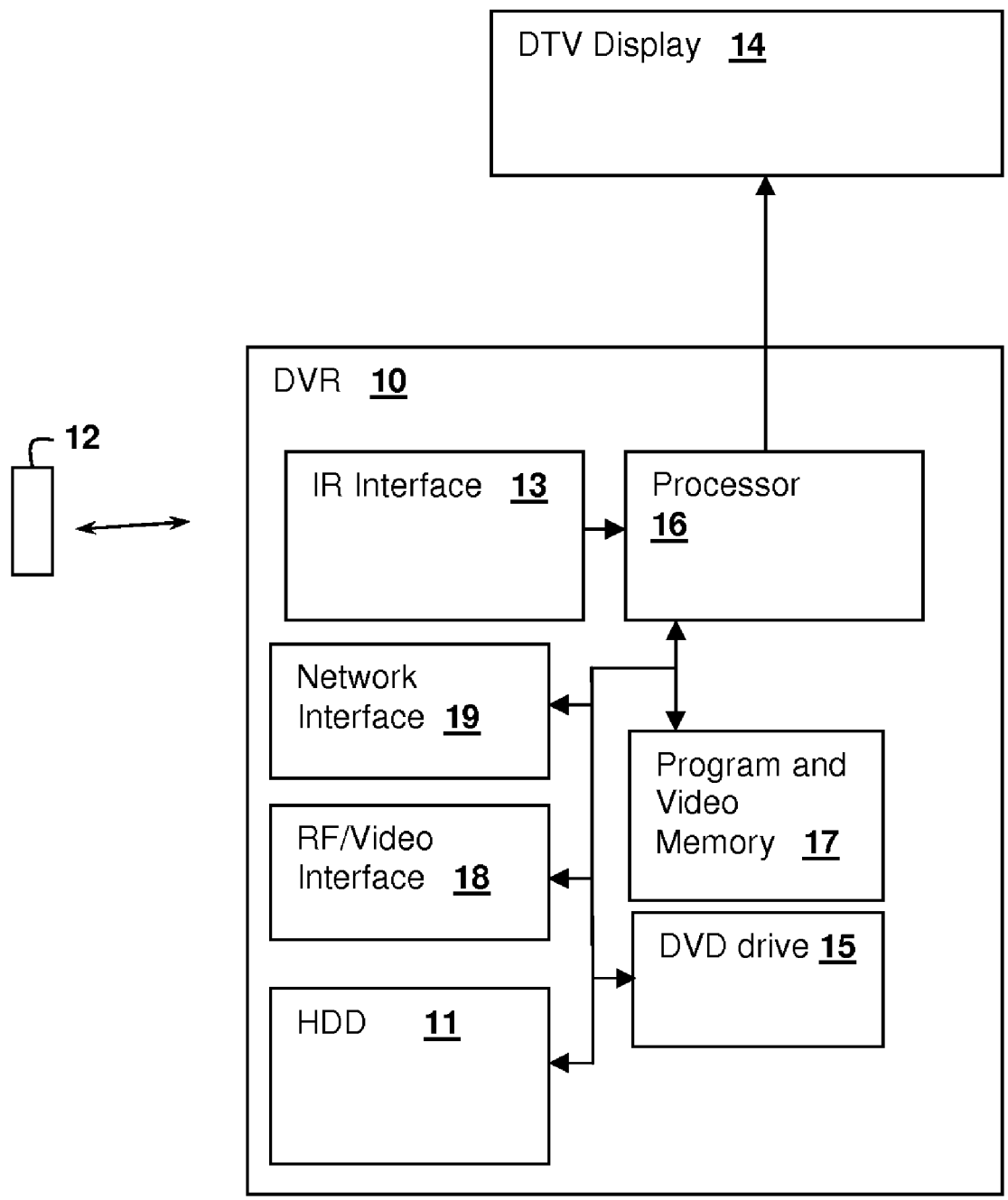
FIG. 1 is a block diagram illustrating a digital video recorder (DVR) in accordance with an embodiment of the present invention.

Referring now to FIG. 1, a digital video recorder (DVR) 10, in accordance with an embodiment of the invention, is shown. DVR 10 is connected to an external digital television (DTV) display 14, but DVR 10 may alternatively be a portable device, such as a personal video recorder (PVR) having an integral display. A remote control 12 is used to control operation of DVR 10, in the exemplary embodiment according to methods of the present invention, in order to provide user input. However, it is understood that other user input methodologies can be employed, such as buttons and other controls integral to DVR 10. Further, if DVR 10 is a PVR, the quota-setting user input may be performed via an external wired or wireless interface, and any alerts sent in response to detection that a quota has been exceeded may also be transmitted via a wired or wireless network. For example, a parent's wireless telephone can be notified via text-messaging e-mail protocols when their child has viewed a program type in excess of a quota. DVR 10 includes an infrared (IR) interface 13 for receiving commands from remote control 12, a processor 16 for executing program instructions that trigger recording in response to detected events in accordance with methodologies described in further detail below, and also provides control and other functionality as generally associated with DVR operations. A program and video memory 17 is coupled to processor 16 for storing data and program instructions, including program instructions in accordance with a computer program product embodiment of the present invention. A radio-frequency (RF)/video interface 18 receives video signals or RF signals from broadcast, closed-circuit or other video streaming sources and provides them for selection by processor 16 for ultimate display by DTV display 14. A network interface 19 provides connection to public or private networks such as the Internet, for receiving administrative input, and transmitting notifications as mentioned above. DVR 10 can also be configured to detect keywords or other indicators from closed-caption information or from Internet sources such as feeds or program guides in order to determine a content type or program title of a video program provided from a specific channel at a specific time. Network interface 19 may also be specified as a video source, receiving video streams (e.g., MPEG streams) at the specified URLs or other URLs. A digital versatile disc (DVD) drive 15 and hard disk drive (HDD) 11 are also included in DVR 10 both for recording video program and other information.

In accordance with an another embodiment of the invention, DTV display 14 may incorporate the above-described quota management and alerting/disabling capabilities of the present invention with respect to viewing of channels provided as input to DTV display 14. Further it is understood that the functionality of DVR 10 can be completely integrated in and merged with the functionality of DTV display 14, so that a single processor 16 and associated components provides both DTV and DVR control.

Figure 2:
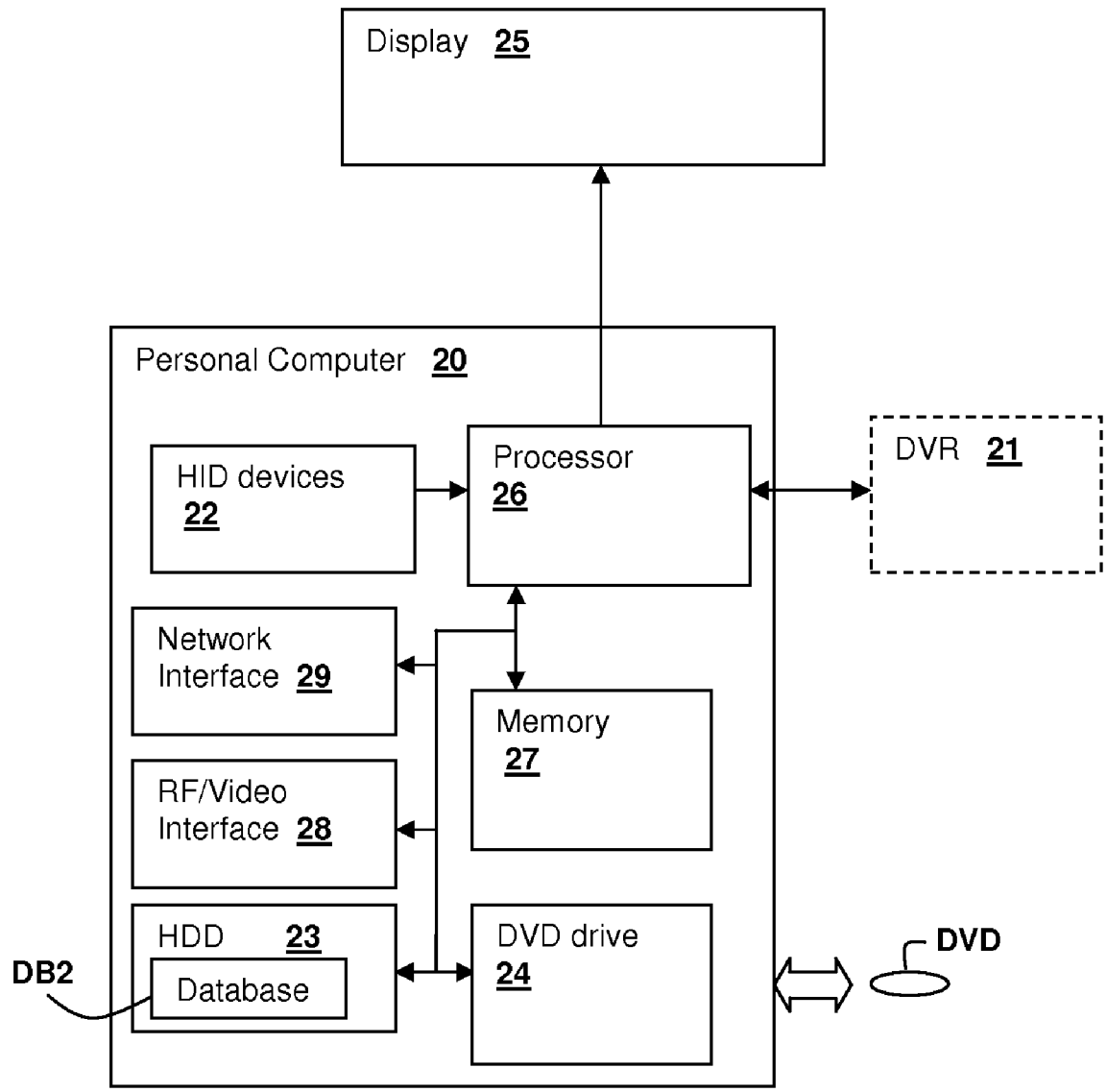
FIG. 2 is a block diagram illustrating a digital video recorder (DVR) in accordance with another embodiment of the present invention.

Referring now to FIG. 2, a DVR in accordance with another embodiment of the invention is illustrated, in the form of a personal computer system 20. The DVR is implemented by personal computer 20, which includes a processor 26 coupled to a memory 27 for storing program instructions including program instructions for implementing a DVR, for example by executing a third-party DVR program. Memory 27 further includes program instructions for carrying out techniques in accordance with the present invention, which may be integrated in such a DVR program, or may be provided by a stand-alone application that monitors and controls video viewing and/or video recording. In an alternative embodiment, a stand-alone DVR 21, may be interfaced to personal computer 20, with an application or service within personal computer 20 providing control of recording by DVR 21 according to quotas configured in the application. The application or service program may be loaded into memory 27 or HDD 23 from a DVD drive 24 from a data storage media forming a computer program product in accordance with an embodiment of the present invention, such as DVD disc DVD. In order to receive video information from closed-circuit or broadcast sources, personal computer 20 includes an RF/Video interface 28. However, techniques in accordance with an embodiment of the present invention can be performed with respect to video received from a network interface 29 and RF/Video interface 28 is not required in such embodiments. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be internal to personal computer 20. An application or service executing within personal computer 20 provides the configuration of time quotas as described above and can block viewing/recording of video information received at RF/Video interface 18 or network interface 19 to HDD 23 or DVD drive 24 in response to detection that a quota or absolute limit has been exceeded.

Figure 3:
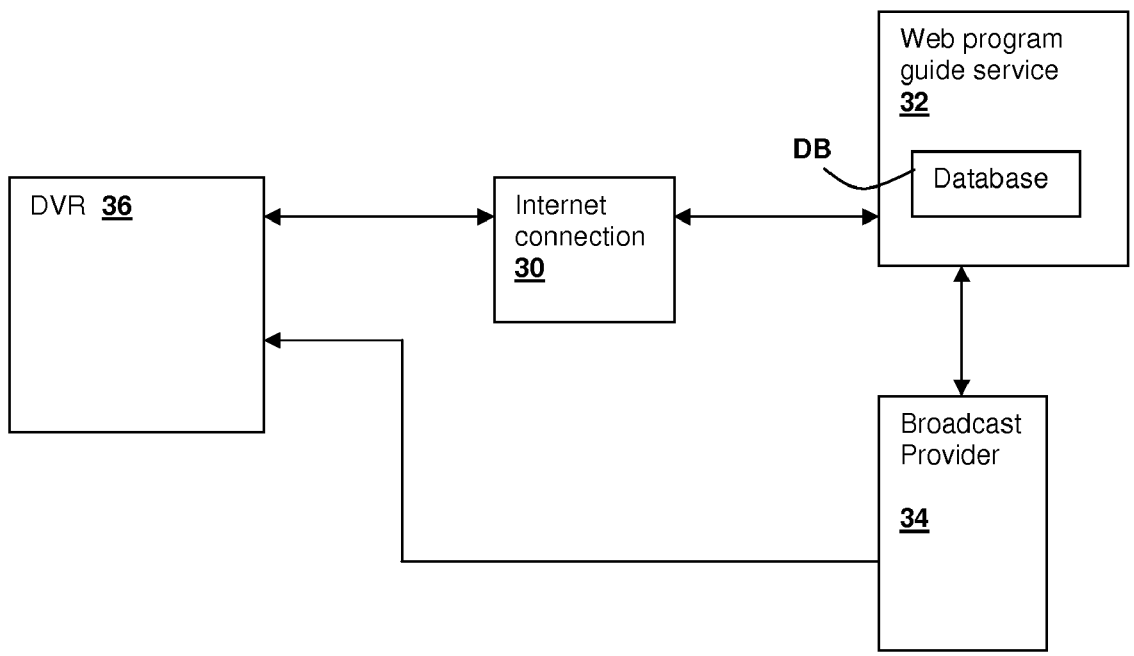
FIG. 3 is a block diagram illustrating a system in accordance with an embodiment of the present invention.

Referring now to FIG. 3, a networked system in accordance with an embodiment of the present invention is shown. A DVR, such as DVR 36, as illustrated in FIG. 1, receives signals from one or more broadcast providers 34, through one or more channels as mentioned above, e.g., RF broadcast, satellite broadcast and/or closed-circuit cable. DVR 36 may also receive video information from a generic network data source, such as an Internet connection 30 or other network connection, which may also carry video data from broadcast provider 34, obviating any need for an RF/Video connection. Control information can be provided from and/or actual control can be provided at broadcast provider 34 or any other Internet data source via Internet connection 30 or may be encoded along with video/RF information received directly from broadcast provider 34. For example, broadcast provider 34 may provide quota management that either blocks video signals sent from broadcast provider 34 directly or may send control information to DVR 36 to disable viewing and/or recording of particular video program types, or sent a notification when their corresponding quota has been exceeded. A web/event service 32 may alternatively provide all of the time total detection/quota configuration described above with reference to FIGS. 1 and 2 and direct DVR 31 to block viewing and/or recording of particular video program channels or programs when the corresponding quota has been exceeded as detected at web/event service 32. Web/event service 32 accesses a database DB to store and retrieve quota information, video program types/categories and past total information for each viewer, who can be identified by the IP address of DVR 36 and a personal identification number (PIN) entered by the user to enable viewing or recording. The depicted system is only exemplary and is intended to illustrate various locations for providing quota management and video programs. However, it is understood that other techniques and system configurations may be applied in accordance with other embodiments of the present invention and the particular system configuration should not be construed as limiting the possible system configurations, data sources and end-user appliances that implement techniques in accordance with the present invention.

Each of the above-described devices and systems may provide a user interface that permits the setting of quotas, and optionally displays the current time totals, which are generally periodically reset, for example on a daily or weekly basis. Table I below shows a status/configuration table that may be presented in editable form to provide a user interface, either on-screen as provided from the device above, or via a browser or application as described above.

TABLE I

| Program Type | Quota to Alert | Absolute Limit | Current Usage |
|---|---|---|---|
| Educational | 6 hr | 6.5 Hr | 2.0 Hr |
| Cartoon | X | 1 Hr | 1 Hr |
| Music | 1 Hr | 1.5 Hr | 1.2 Hr |

As seen in Table I, both the alert-on-quota/extend-to-absolute-limit technique and the disable-on-quota techniques described above can co-exist in the same schema. In Table I, the presence of an X for "Quota to Alert" for the program type "cartoon", specifies that no alert will be sent, and the absolute limit value becomes the quota value after which viewing will be immediately disabled. For other types of programs such as "Music", both a quota, which will cause an alert if exceeded, and an absolute limit are specified after which viewing/recording will be completely disabled. The current usage display optionally shows how much time (within or above the quota, as in the "Music" example above) the user has spent viewing, recording or has selected for recording, the various program types for the current quota interval.

Figure 4:
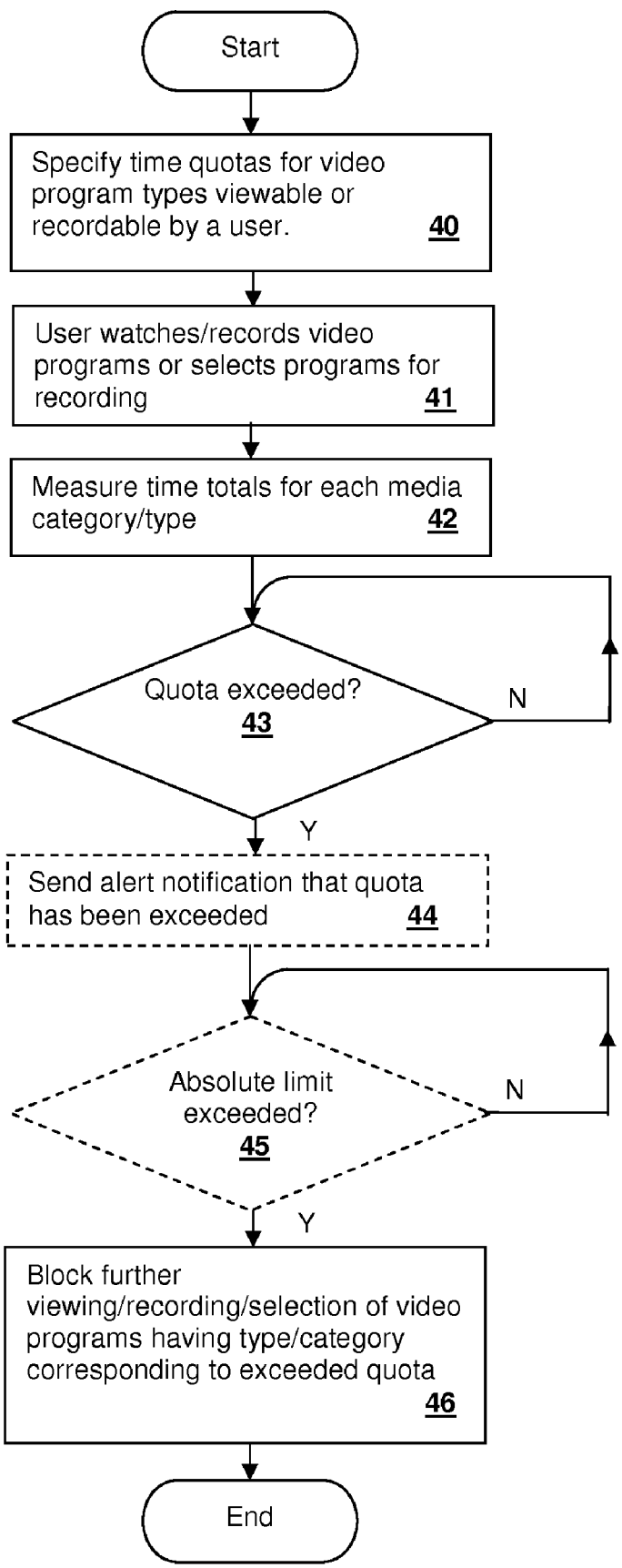
FIG. 4 is a flowchart of a method in accordance with an embodiment of the present invention.

Referring now to FIG. 4, a method according to an embodiment of the present invention is illustrated in a flowchart. First, a user specifies time quotas for video program types viewable or recordable by the user or another user (step 40). The user (or another user) watches and/or records video programs or selects video programs for recording (step 41) and time totals are measured for each video category/type (step 42). If a quota is exceeded (decision 43) an alert may be optionally sent to the viewer or another indicating that the quota has been exceeded (step 44) and the viewing/recording may optionally proceed until an absolute time limit is exceeded (decision 45). After the time quota has been exceeded (or optionally the absolute limit), further viewing/recording/selection of video programs having the type or category corresponding to the exceeded quota is blocked (step 46).

Figure 5:
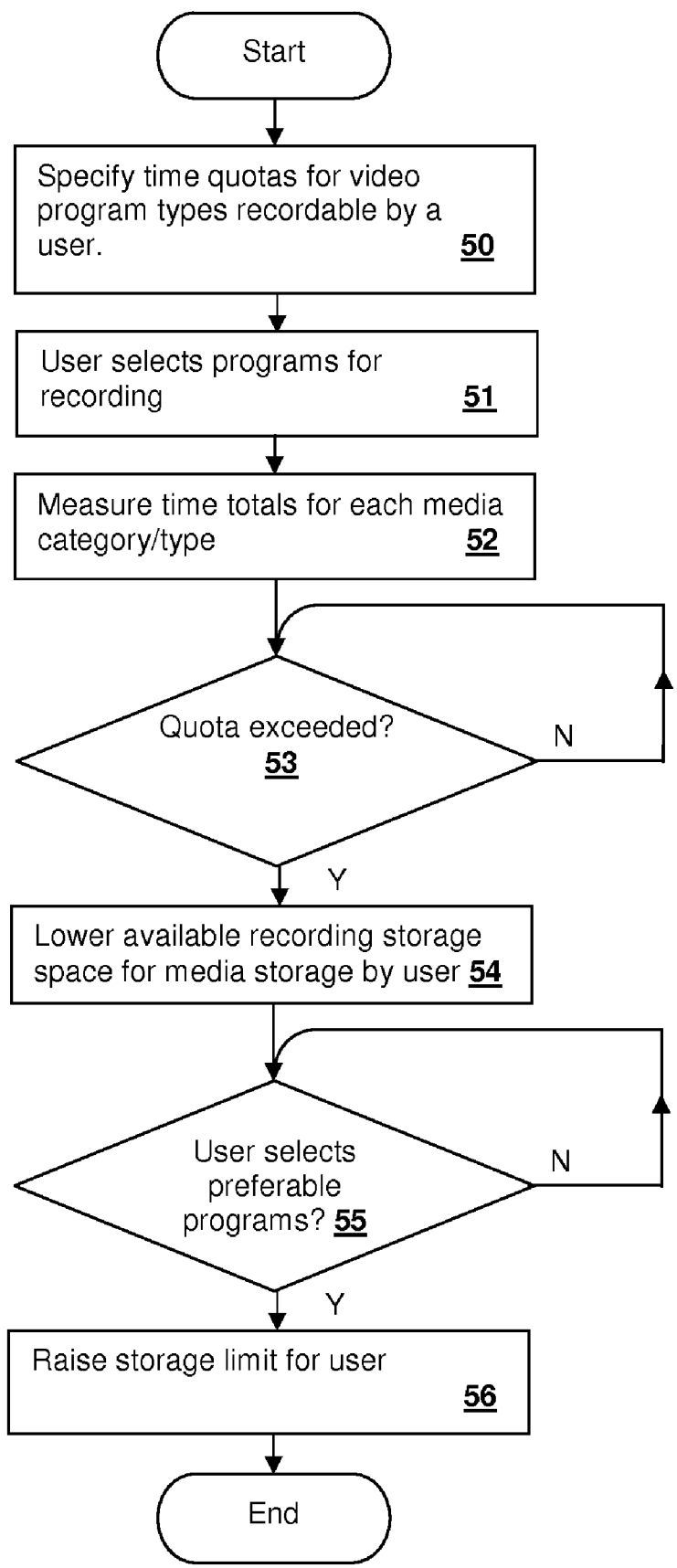
FIG. 5 is a flowchart of a method in accordance with another embodiment of the present invention.

Referring now to FIG. 5, a method according to another embodiment of the present invention is illustrated in a flowchart. First, a user specifies time quotas for video program types recordable by a user (step 50). The user (or another user) selects programs for recording (step 51) and time totals are measured for each video category/type (step 52). If a quota is exceeded (decision 53), the recording space available to the user for recording can be reduced (step 54). As the user selects more preferable programs (decision 55), the storage limits are increased (step 56). For example, if a child is allocated 1 hour of cartoon recording and 4 recording hours total and selects five hours of educational programming, the total recording time may be increased, e.g., by adding another hour or more so that at least 1 hour of cartoon recording time remains and possibly more. Alternatively, if the child were to 1 hour of cartoon recording and select three additional hours for recording music programs only, then their total storage space can be restricted to the original four hours. While the above algorithm does not force the child into recording educational content, it provides a motivation to select the educational content over other alternatives, as more of their own selected programming can be recorded by them and later viewed. Alternatively, the preferred content can be always-permitted, causing the recording device to operate in a manner similar to the quota cut-off method depicted in FIG. 4.

While the above-described exemplary embodiments illustrate operation for a single user, multiple accounts can be supported by providing identifying means such as the above-described PIN input requirement for operating the devices and systems of the present invention. Further, an "administrative" user may adjust the "class" of the viewer(s), providing modes such as day-before-school-day vs. weekend, special statuses indicating whether a child's homework is done, and so forth, providing flexibility in the selection of quotas for specific persons and conditions.

As mentioned above a variety of methods may be used to categorize program types, including specifying particular channels as corresponding to a program type, specifying particular channel/time slot combination as pertaining to a particular program, retrieving program information from electronic program guides or embedded metadata, matching keywords in closed-caption information, extracting rating and other information located in embedded metadata, and matching social public tags or privately administrated tags to determine the content type. With respect to the closed-caption keyword matching, a weighted scheme may be included that analyzes the actual language of dialogues presented in the closed-caption information, for example by detecting expletives and other elements to determine the content type.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of controlling a video recording device, the method comprising:

a processor receiving input specifying a number of recording time quotas associated with corresponding media types of video programs selectable by a user for recording by the video recording device;

the processor specifying a total amount of media storage allocable for recording video programs selected by the user;

the processor measuring total time periods of recording of video programs for the media types to accumulate time totals for the media types;

the processor, in conformity with a result of the measuring, automatically and without user intervention, adjusting the total amount of media storage allocable for recording the video programs selected by the user, wherein the adjusting increases the total amount of media storage if the result of the measuring indicates selection of more-preferable video programs by the user, and wherein the adjusting decreases the total amount of media storage if the result of the measuring indicates selection of less-preferable video programs by the user;

the processor determining whether or not a given one of the time totals has exceeded a corresponding given time quota; and the processor, in response to determining that given time total has exceeded the corresponding time quota, taking action to prevent further exceeding the given time quota.

2. The method of claim 1, wherein the processor taking action comprises the processor blocking the further viewing or recording of video programs having a media type corresponding to the given time quota.

3. The method of claim 1, wherein the processor taking action comprises the processor issuing an alert that the given time quota has been exceeded.

4. The method of claim 3, further comprising:
the processor determining whether or not the given time quota has exceeded an absolute limit; and
the processor, responsive to determining that the given time quota has exceeded the absolute limit, blocking the further viewing or recording of video programs having a media type corresponding to the given time quota.

5. A system for recording digital video, the system comprising:
a processor for executing program instructions;
a computer-readable storage device, coupled to the processor;
program instructions, stored on the storage device for execution by the processor, to receive input specifying a number of recording time quotas associated with corresponding media types of video programs selectable by a user for recording by the video recording device;
program instructions, stored on the storage device for execution by the processor, to specify a total amount of media storage allocable for recording video programs selected by the user:
program instructions, stored on the storage device for execution by the processor, to measure total time periods of recording of video programs for the media types to accumulate time totals for the media types;
program instructions, stored on the storage device for execution by the processor, to, in conformity with a result of measuring the total time periods to accumulate the time totals, automatically and without user intervention, adjust the total amount of media storage allocable for recording the video programs selected by the user, wherein the program instructions to adjust increase the total amount of media storage if the result of the measuring indicates selection of more-preferable video programs by the user, and wherein the program instructions to adjust decrease the total amount of media storage if the result of the measuring indicates selection of less-preferable video programs by the user;
program instructions, stored on the storage device for execution by the processor, to determine whether or not a given one of the time totals has exceeded a corresponding given time quota; and
program instructions, stored on the storage device for execution by the processor, to, in response to determining that given time total has exceeded the corresponding time quota, take action to prevent further exceeding the given time quota.

6. The system of claim 5, wherein the program instructions for taking action comprise program instructions to block the further viewing or recording of video programs having a media type corresponding to the given time quota.

7. The system of claim 5, wherein the program instructions for taking action comprise program instructions to issue an alert that the given time quota has been exceeded.

8. The system of claim 7, further comprising:
program instructions, stored on the storage device for execution by the processor, to, determine whether or not the given time quota has exceeded an absolute limit; and
program instructions, stored on the storage device for execution by the processor, to, responsive to determining that the given time quota has exceeded the absolute limit, block the further viewing or recording of video programs having a media type corresponding to the given time quota.

9. A computer program product for controlling a video recording device, the computer program product comprising a computer-readable storage device having a plurality of program instructions stored therein for execution by a processor of the video recording device, the plurality of program instructions comprising:
program instructions for receiving input specifying a number of recording time quotas associated with corresponding media types of video programs selectable by a user for recording by the video recording device;
program instructions for specifying a total amount of media storage allocable for recording video programs selected by the user;
program instructions for measuring total time periods of recording of video programs for the media types to accumulate time totals for the media types;
program instructions for, in conformity with a result of the measuring, automatically and without user intervention, adjusting the total amount of media storage allocable for recording the video programs selected by the user, wherein the program instructions for adjusting increase the total amount of media storage if the result of the measuring indicates selection of more-preferable video programs by the user, and wherein the program instructions for adjusting decrease the total amount of media storage if the result of the measuring indicates selection of less-preferable video programs by the user;
program instructions for determining whether or not a given one of the time totals has exceeded a corresponding given time quota; and
program instructions for, in response to determining that given time total has exceeded the corresponding time quota, taking action to prevent further exceeding the given time quota.

10. The computer program product of claim 9, wherein the program instructions for taking action comprise program instructions for block the further viewing or recording of video programs having a media type corresponding to the given time quota.

11. The computer program product of claim 9, wherein the program instructions for taking action comprise program instructions for issuing an alert that the given time quota has been exceeded.

12. The computer program product of claim 11, wherein the plurality of program instructions further comprise:
program instructions for determining whether or not the given time quota has exceeded an absolute limit; and
program instructions for responsive to determining that the given time quota has exceeded the absolute limit, blocking the further viewing or recording of video programs having a media type corresponding to the given time quota.

* * * * *